Oct. 15, 1957     H. E. HARTIG ET AL     2,809,445
ADVANCED BEARING TEACHER
Filed April 19, 1943     8 Sheets-Sheet 1

INVENTORS
HENRY E. HARTIG
FIRTH F. PIERCE
GEORGE A. BRETTELL jr.
By M. A. Hayes
ATTORNEY Oct. 15, 1957   H. E. HARTIG ET AL   2,809,445
ADVANCED BEARING TEACHER
Filed April 19, 1943   8 Sheets-Sheet 3

INVENTORS
HENRY E. HARTIG
FIRTH F. PIERCE
GEORGE A. BRETTELL Jr.
BY
ATTORNEY

Oct. 15, 1957 H. E. HARTIG ET AL 2,809,445
ADVANCED BEARING TEACHER
Filed April 19, 1943 8 Sheets-Sheet 5

INVENTORS
HENRY E. HARTIG
FIRTH F. PIERCE
GEORGE A. BRETTELL jr

By M. A. Hayes
Attorney

Oct. 15, 1957

H. E. HARTIG ET AL 2,809,445

ADVANCED BEARING TEACHER

Filed April 19, 1943

INVENTORS
HENRY E. HARTIG
FIRTH F. PIERCE
GEORGE A. BRETTELL, jr.
BY
*M.A.Hayes*
ATTORNEY Oct. 15, 1957    H. E. HARTIG ET AL    2,809,445
ADVANCED BEARING TEACHER
Filed April 19, 1943    8 Sheets-Sheet 7

INVENTORS
HENRY E. HARTIG
FIRTH F. PIERCE
GEORGE A. BRETTELL, jr.
BY
ATTORNEY

INVENTORS
HENRY E. HARTIG
FIRTH F. PIERCE
GEORGE A. BRETTELL, jr.
BY
ATTORNEY

United States Patent Office 2,809,445
Patented Oct. 15, 1957

2,809,445

ADVANCED BEARING TEACHER

Henry E. Hartig, Firth Pierce, and George A. Brettell, Jr., San Diego, Calif., assignors to the United States of America as represented by the Secretary of the Navy Application April 19, 1943, Serial No. 483,620

18 Claims. (Cl. 35—10.4)

This invention relates to a device for training students in the operation of sound gear.

In recent years, and particularly since the advent of the present war, methods of echo-ranging have become more and more important in locating surface and underwater craft and objects at sea. The sonic mechanisms used in such echo ranging vary greatly, but they generally comprise an underwater transducer mounted on a rotatable shaft so that sound signals may be sent and echoes received in any desired direction. The gear designed to operate the transducer also generally consists of a central gyro-compass repeater dial mounted centrally of a stationary relative bearing dial by means of which can be read the bearing of the ship on which the gear is installed. Additionally and intermediate these two dials is a so-called "bug dial," which represents the direction in which the transducer is trained at any instant.

Because sound gear is somewhat complicated and because several types of sound signals are received by the system, training of operators becomes of great importance.

It is obviously not feasible to train all operators under actual conditions at sea because such operation utilizes considerable equipment, including a ship, and in time of war, it may prove very dangerous.

For these reasons, it is desirable to have a machine which can reproduce, as nearly as possible, the conditions at sea, so that operators can be trained safely and without great expense.

The method of operation of sound gear is not difficult but certain human qualities, such as tone perception, physiological motor control, intelligence, reaction time, etc., have been found to be important factors in the successful operation of such gear. Thus, another of the purposes of the invention is a means for choosing sound operators who are physiologically fitted for the position. In this same connection, it should also be noted that the invention gives some indication as to whether or not a perspective operator is subject to fatigue produced by continued concentration on the same or similar continuous or recurring sounds.

Of greatest importance, however, is actually familiarizing the prespective operator with conditions and problems met in actual practice. Two measurements, bearing and range, are the most important ones obtained by sound gear, but the present invention is designed to teach the operator to determine only the bearing. The range measurement is generally automatic in the present device, although its limits may be changed by means of a switch to simulate either a long or short range search.

The range being determined automatically, the bearing becomes important. Thus, when a short sound signal, called a ping, is put into the water, the transducer is then shifted to the bearing to be scanned and held in that position to determine whether an echo, indicating the presence of a target, is received. The next ping is automatically or manually sent out and the gear is trained to a new bearing for listening. This procedure is continued until an echo is received and the operator then knows that a target is positioned in a direction very close to that indicated by the bug dial, which indicates the direction in which the transducer is trained.

In practice, the amplitude of the echo signal is, of course, attenuated on either side of the actual bearing of the target so that the operator, by searching in that general direction, can determine the maximum amplitude, and thus the actual bearing, within one or two degrees.

Once the target has been located, it may be desired to either avoid or destroy it. If the latter course is chosen, the problem becomes a difficult one, for both the ship on which the gear is mounted and the target may be moving with respect to the water and one another. Either may change direction, and in the case of an attack, its success depends largely on the ability of the sound operator to obtain accurate information on the position of the target at all times, regardless of the relative changes in position. By means of the amplitude and direction of the received echoes and the changes in true bearing of the ship, as indicated on the gyro-compass repeater dial, the relative change in position of the target may be determined with respect to the ship, and, if possible, the transducer kept trained in the direction of the target at all times. The operator, during this whole performance, calls out to the conning officer, the relative bearing of the target as indicated by the bug and relative bearing dials.

The preceding discussion has dealt primarily with the mechanical procedure. However, equally important is the ability of the operator to distinguish the various sounds heard in the echo-ranging equipment. First of all, with no sound signals being introduced into the water, there is always present a certain amount of noise, called "water noise." Its frequency, amplitude and direction are completely at random, and as a consequence it is detected under all circumstances. When the sound ping is put into the water, the phenomenon of reverberation becomes evident, as an appreciable amount of the sound is seemingly reflected back into the transducer by innumerable small targets. The time for the reverberation to die out varies but it may last long enough to cause considerable confusion in recognizing the returning echo. An additional factor is the variation in the ratio of signal ping to echo amplitude which may vary through rather wide limits.

Lastly, the Doppler effect is quite noticeable if there is any appreciable velocity of the target with respect to the water along the axis of the sound beam. As is obvious, the received echo will be of a higher frequency than the emitted ping if the target possesses a velocity in the direction of the transducer and vice versa. This is important, for the operator can determine whether the position and target are changing and the direction of this change. Equally obvious is the importance of determining the ability of the prospective operator to recognize and interpret the Doppler effect.

All of the various sounds just described vary greatly under various circumstances and it is also the purpose of this invention to provide means for changing their various values to more nearly represent actual conditions.

The invention, called "Advanced Bearing Teacher," is shown in Figs. 1 and 2. The student's panel of the invention (Fig. 1) has the same dials and controls as does the actual gear. These include the gyro-compass repeater, bug, and relative bearing dials, a training hand wheel for rotating the transducer, a meter for reading output, a gain control, a control for limiting output, a phone jack and switches for putting the gear into operation.

The instructor's panel, opposite the student's, shown in Fig. 2, mounts a similar set of dials (see Fig. 7 for details), a crank for simulating turning of the ship on which the gear is mounted, a second crank for simulating turning of the target and four controls for altering the following effects: (1) the ratio of signal to echo amplitudes, (2) amplitude of water noise, (3) degree of Doppler, and (4) amplitude and length of reverberation.

*Mechanical description*

Figure 1:
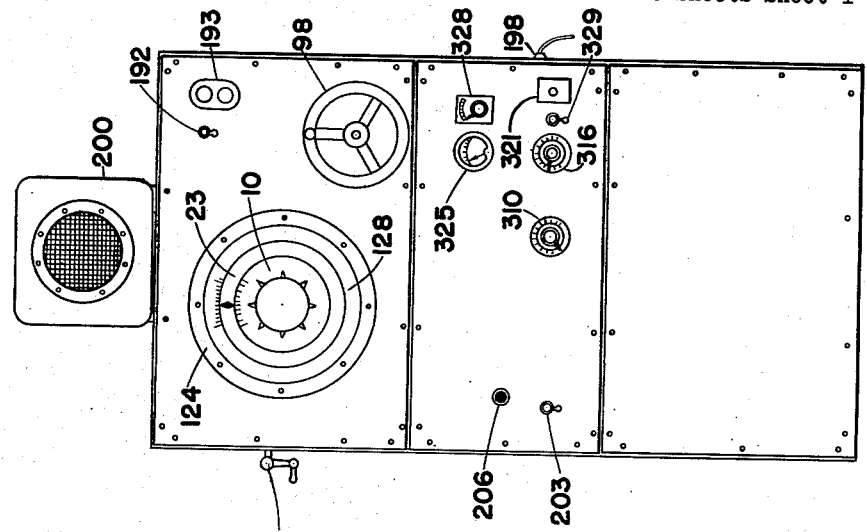
Fig. 1 is an elevation of the student's panel of the invention.
Figure 3:
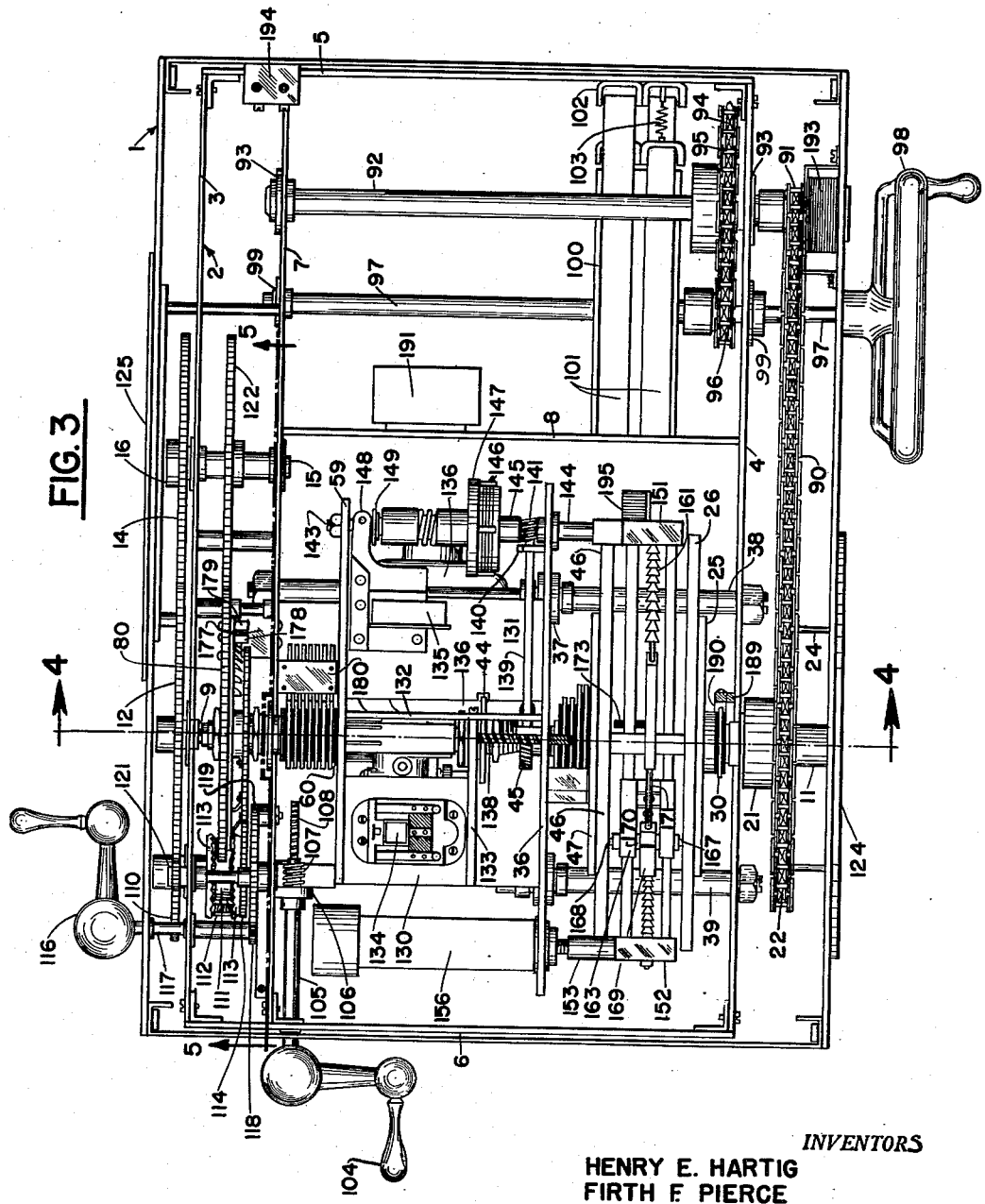
Fig. 3 is a top view of the invention with the top of the cabinet removed and showing the mechanical assembly with the electrical control circuit and parts of the external controls removed.

The mechanical portion of the device is inclosed in the upper portion of the cabinet, generally designated 1, and as shown in Figs. 1 and 3. A frame, generally designated 2, is fixedly mounted within the cabinet. This frame is rectangular in shape with sides 3 and 4 and ends 5 and 6 and is divided into several compartments by means of partitions. One partition 7 runs lengthwise of the frame parallel to and adjacent to side 3, and a narrow partition 8 runs crosswise of the frame near the top.

Figure 4:
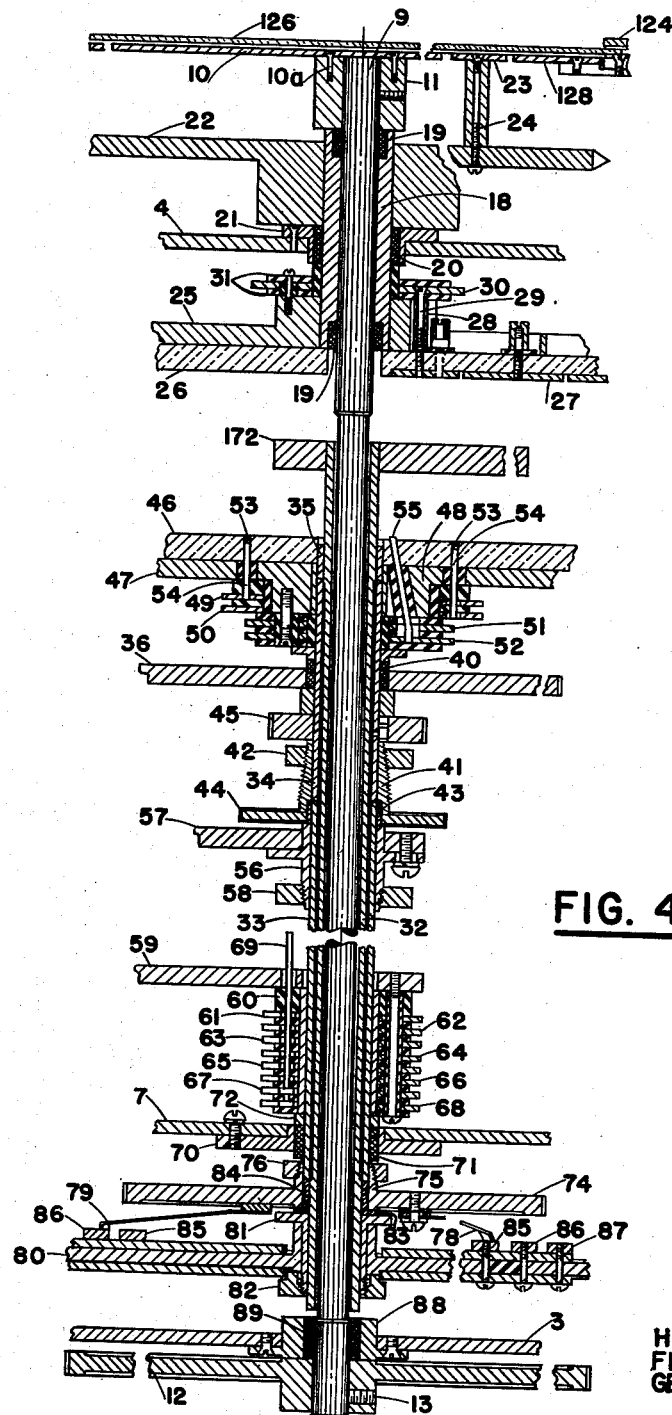
Fig. 4 is an inverted sectional view of the main shaft assembly along the line 4—4 of Fig. 3 with the main shaft shown in elevation and with portions of the gears and disks broken away, and portions of the device mounted on the carriage supports omitted for clarity.
Figure 7:
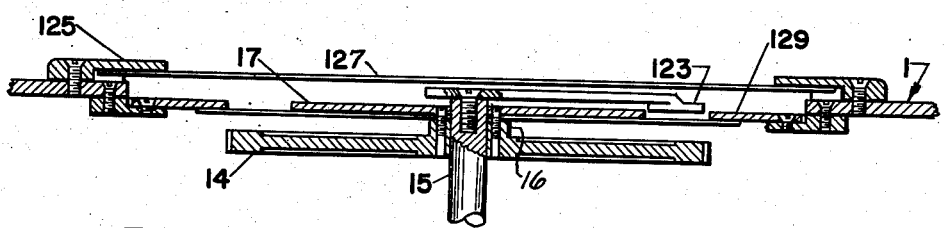
Fig. 7 is a small sectional view of the instructor's dials, showing details of construction.

The main assembly is mounted along a main shaft 9 of Fig. 3. At its right hand (or student's) end, as shown in Fig. 4, is a dial 10, called the gyro-compass repeater dial, which is mounted by means of set-screw 10a in its hub 11. At the opposite end of the shaft is a gear 12 (see Fig. 3) fixedly mounted by means of a set-screw 13. This gear meshes with a similar gear 14 which is freely rotatable on a short shaft 15 which extends from partition 7 through the side 3 of the frame and the cabinet 1. Gear 14 carries a hub 16 to which is fixed a second gyro-compass repeater dial 17 (see Fig. 7).

Near the student's end of shaft 9 (adjacent dial 10) is a short shaft 18 which is hollow and concentric with shaft 9 as shown in Fig. 4. Bearings 19, positioned between the two shafts, allow shaft 18 to be freely rotatable around shaft 9. Shaft 18 is also held in place by a bearing 20 fixedly mounted in partition 4 by means of a bearing hub 21. A large sprocket 22 is secured to shaft 18, which gear is in turn bolted to bug dial 23 by means of bolts 24. A metal backing plate 25 is also secured to shaft 18 to support a non-conducting projector disk 26.

The projector disk 26 carries an angular metal segment, generally designated 27, to be subsequently described, and as shown in Fig. 4. It is situated in a slot in the hub of plate 25 and is electrically connected to a pin 28 by means of a screw extending through the disk. Pin 28 is insulated from the plate 25 and is threaded to receive a screw contact 29 secured to a slip ring 30. Slip ring 30 is also secured to the hub of plate 25 by means of bolts but is likewise insulated from it by means of rubber washers 31.

A second hollow shaft 32 (see Fig. 4) is also positioned concentrically around shaft 9. This extends from the instructor's end of shaft 9 to a point somewhat beyond the mid-point of the shaft. Two shorter hollow shafts 33 and 34 are positioned one at each end of shaft 32. These are abutting and concentric with shafts 32 and 9 and surround both of the latter. A bearing 35 supports one end of shaft 34 for rotation about shaft 32. A large support disk 36 is mounted to rest on two idler disks 37 which are mounted on two stationary shafts 38 and 39. Thus the idlers 37 support disk 36 which also helps to support shaft 34 by means of bearing 40. At the opposite end of shaft 34, which end abuts shaft 33, is a collet 41, secured to the shaft by means of a tapered nut 42. The collet extends over the end of shaft 34 and carries a bearing 43 on this extended portion to support the adjacent end of shaft 33. A gear 44 is mounted on the external portion of this extension for a purpose to be described. Adjacent the opposite end of the collet 41 is a spiral gear 45 fixed to shaft 34, also for a purpose to be described later.

Figure 6:
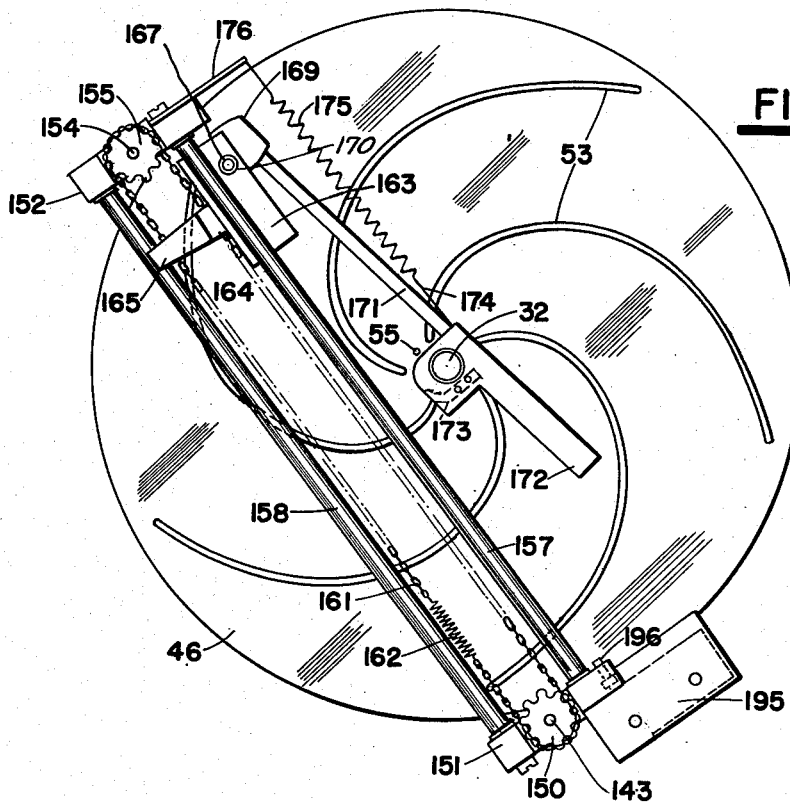
Fig. 6 is a side elevation of the projector disk and the elements attached thereto.

The remaining portion of shaft 34 is used to mount the echo disk assembly which is shown in detail in Fig. 6. This comprises a non-conducting echo disk 46, similar to projector disk 26, mounted on the shaft 34 by means of a metal backing plate 47 formed with a hub 48. Hub 48 carries four separate slip rings 49, 50, 51 and 52 and each ring is electrically insulated from the hub and other rings.

On the opposite side of the echo disk 46 are five metal inserts 53 in the form of Archimedes spirals as shown in Fig. 6. Slip ring 49 is electrically connected by means of conductors 54 to each of the spiral inserts, and slip ring 50 is connected by means of one of said conductors to a single spiral. The remaining two slip rings are connected to five point contact inserts 55 positioned in disk 46 in a similar manner, ring 51 contacting each of the point inserts and ring 52 contacting only one of the five.

The end of shaft 33 which abuts shaft 34 also carries a collet 56 provided with a flange as shown in Fig. 4. A support 57 is bolted to this flange for a purpose to be described and the whole unit is pressed to the shaft by means of a spiral nut 58. An additional support 59 is secured to shaft 33 and adjacent thereto is a slip ring mount 60 carrying eight slip rings 61–68. Each ring is insulated from the mount 60, the shaft, and the other rings and is provided with a contact pin 69 in order to make electrical connections to be described later.

Partition 7 carries a bearing support 70. This mounts bearing 71 to hold shaft 33 in alignment and is separated from the slip ring mount 60 by means of a thrust ring 72. A second thrust ring 73 (not shown) separates the bearing support 70 from gear 74 formed with a collet hub 75, which gear is secured to the shaft by means of spiral nut 76.

Gear 74 carries a spider, generally designated 77, which has two sets of legs 78 and 79 (shown in detail in Fig. 5) Adacent gear 74 is another gear 80, the hub of which is mounted on a collet 81 and secured to shaft 32 by means of locknut 82. Collet 81 is spaced from gear 74 by means of a thrust ring 83 and it should be stated here that shaft 33 is supported against shaft 32 at this point by means of bearings 84. Gear 80 carries three insulated slip rings 85, 86 and 87. The shorter set of legs 78 on spider 77 contacts ring 85 and the longer set of legs 79 contacts ring 86. Frame side 3 carries a bearing support 88 which in turn carries a bearing 89 to hold the instructor's end of shaft 9 in place.

The portion of the device supported along the line of shaft 9 has several means of control, as is shown in Fig. 3. Sprocket 22 is operated by a chain 90 driven by a small sprocket 91. Sprocket 91 is fixed to a shaft 92 mounted in bearing supports 93 in frame side 4 and partition 7. Just inside frame side 4, shaft 92 carries a larger sprocket 94 which is driven by chain 95 from sprocket 96 mounted on shaft 97. Shaft 97 carries the student's handwheel 98 on the outside of the cabinet and is supported by bearing supports 99 in frame side 4 and partition 7. The shaft also carries a large friction wheel 100, which is engaged by two canvas straps 101 the ends of which are attached to end 5 of the frame. The two straps are wound in opposite directions about wheel 100, one end of each being fixed by clamp 102 and the other end of each by a spring 103. It is clear, therefore, from this arrangement that handwheel 98 and the elements driven thereby may be freely rotated while at the same time the canvas straps 101 will offer sufficient friction to damp the momentum of the rotating elements so that they may be readily stopped at any desired bearing reading.

Figure 2:
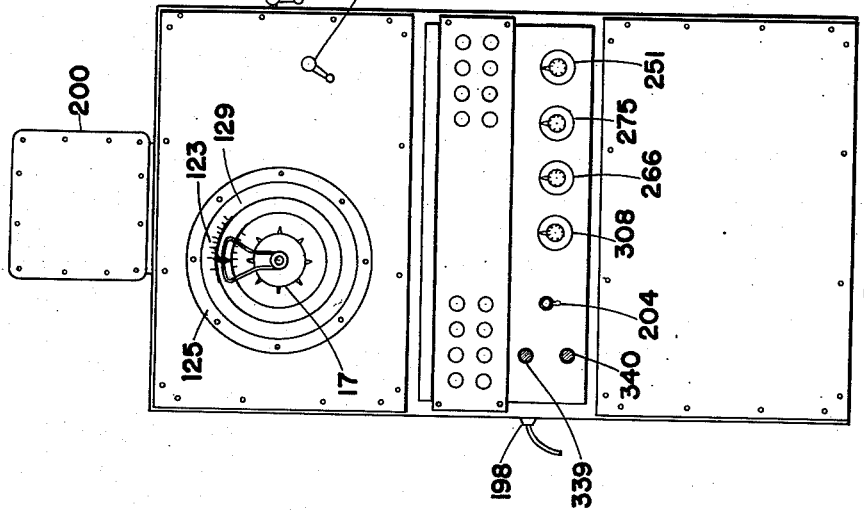
Fig. 2 is an elevation of the instructor's panel of the invention.
Figure 5:
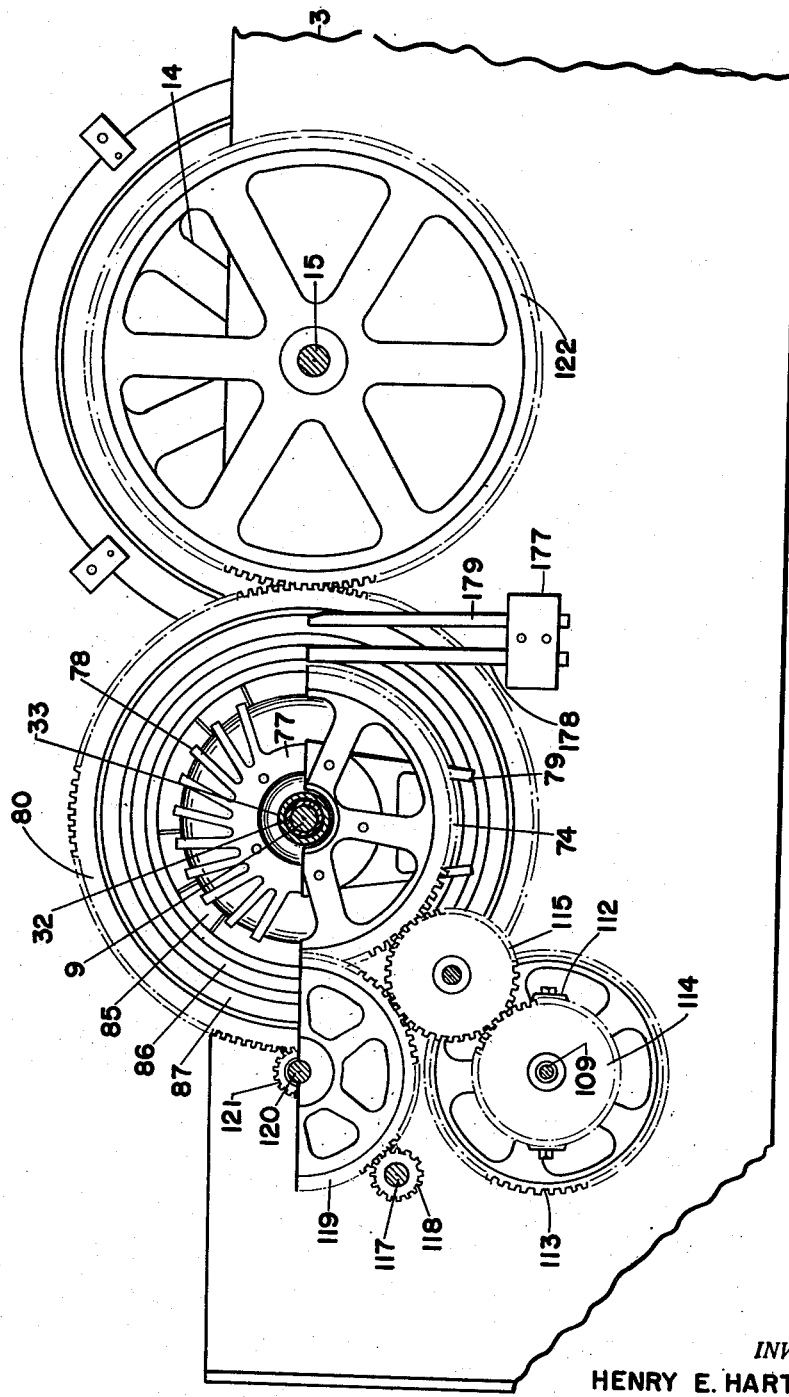
Fig. 5 is a sectional view along the line 5—5 of Fig. 3 with certain of the gears and panels broken away for clarity, and with the cabinet (and attached elements) and certain supports omitted.

On the instructor's panel of the device, as shown in Fig. 2, are two means of control. Handwheel 104 is secured to a short shaft 105 which passes through the wall of the cabinet and the end 6 of the frame. The opposite end of the shaft is supported by a bracket 106 attached to partition 7 and carries a worm gear 107, as shown in Fig. 3. The worm operates gear 108 secured to shaft 109 which extends through partition 7 and frame side 2 and supports a gear 110 freely rotatable on its other end to mesh with gear 12. Between partition 7 and side 2 the shaft supports a set of differential gears. The set of differential gears comprises a spider 111, two pinion gears 112, and input-output gears 113. The spider which mounts the two pinion gears 112 is keyed to shaft 109. The input-output gears 113 mesh with each of the pinion gears whereby when one of the input-output gears drives the pinions, rotation is transferred to the opposite input-output gear through such pinion gears in a conventional manner as can be seen in Fig. 5. An additional gear 114 is collared to one of the input-output gears and thus rotates with the gear to which it is collared. Gear 114 is arranged to mesh with idler gear 115 whereby rotation of input-output gear is transferred through gear 114 and idler gear 115, to transfer rotation to gear 74 mounted on shaft 33. The purpose of this mechanism is to afford rotation of the two concentric shafts 9, 33 in the same direction and at the same speed. Thus when the input-output gears 113 rotate at the same speed (in opposite directions), shafts 9, 33 rotate at the same speed in the same direction.

The last means of control is handweel 116 mounted on shaft 117 on the instructor's panel. At the opposite end of the shaft 117 is a small gear 118 which meshes with a larger idler gear 119 on shaft 120 which also mounts gear 121 to mesh with gear 12. Additionally, it should also be noted that adjacent gear 122 is fixedly mounted on shaft 15 and that a bug dial 123 is mounted on the outer end of the shaft.

On the sides of the cabinet where the gyro-compass repeater dials 10 and 17 and the bug dials 23 and 123 are visible, circular frames 124, 125 are secured for mounting transparent covers 126 and 127, so that the dials may be easily read, as shown in Figs. 1 and 2. Just inside the frames, so as to be equally visible, are two relative bearing dials 128 and 129 (which indicate relative bearing between the direction of the ship and the training of the projector) on which the reading of the corresponding bug dial may be determined. The relative bearing dials and the gyro-compass repeater dials are marked off into 360° divisions, but in the views of Figs. 1 and 2 all except a few of the divisions have been omitted for simplicity.

In describing the elements secured along main shaft 9, certain elements were left undescribed because they are mounted for rotation with support disk 36 and support 59. As shown in Fig. 3, two flat brace plates 130 and 131 are mounted between units 36 and 59, and another similar brace 132 is mounted at right angles to them. Still another brace 133 is mounted between plate 130 and brace 132. A range-change relay 134 is mounted on plate 130, and a clutch relay 135 is mounted on support 59. On the opposite side of the plates, a synchronous motor 136 is mounted on plate 131. It is provided with a set of reduction gears and by means of gear 137 drives gear 44. Gear 44 is fixed to rotate with gear 45 on shaft 34, and gear 45 meshes with gear 138 mounted on shaft 139 fixed to support disk 36. It can be observed from Fig. 3 that gear 138 is reasonably large compared with gear 45 and has its plane positioned transversely to the plane of 45. Both gears have helical teeth so that the rotation of shaft 139 and gear 138 acts to rotate gear 45.

The other end of shaft 139 is positioned by bracket 140, and carries a small worm gear 141. Worm gear 141 meshes with gear 142 which is positioned below gear 141 in the view of Fig. 3, the gear 142 being mounted freely on shaft 143 which is held in place by a housing 144. Gear 142 is formed integral with one side 145 of a conventional friction clutch, generally designated 146. The other side 147 of the clutch is secured to shaft 143 and an arm 148, on relay 135, is arranged to engage washer 149 on side 147 to operate the clutch.

The opposite end of shaft 143 carries a small sprocket 150 (as shown in Fig. 6) and is mounted in an insulated support 151 forming part of housing 144, as shown in Fig. 3. Thus, sprocket 150 is in place in a position between the echo and projector disks 26, 46. On the opposite side of the support disk 36, about 160° around it, is a similar support 152. This support is likewise held in place by means of a housing 153 mounted on the support disk. A shaft 154 is positioned inside the housing and carries a sprocket 155 identical with sprocket 150. The opposite end of shaft 154 is connected to a return mechanism 156, which includes a dash pot, of a conventional type for a purpose to be described later.

As shown in Fig. 6, four spaced metal rods 157, 158, 159, 160 are positioned to extend parallel to and across the face of disk 46. Their ends are rigidly supported in two end supports 151, 152. The rods (in cross section) are mounted at the corners of a rectangle and a chain 161 extends in the direction of their length and is positioned between them. This chain is arranged to pass over the two sprockets 150, 155, described above, which are mounted near the ends of the rods, to form a loop. The chain loop is not complete, but a spring insert 162 holds the ends together. A slider 163 is mounted to slide along rods 157, 159. It is formed with a hole which receives rod 159 to guide its motion. The other rod 157 rides in the slot, as shown in Fig. 6, to prevent rotation. The slider is attached by insulated means to chain 161 so that as the sprockets 150, 155 rotate, the chain carries the slider along the rods 157, 159.

The slider also carries two spring contacts 165, 166 on two of its opposite faces (only one of which is visible in Fig. 6). These contacts engage the other two rods 158, 160, respectively. The slider also carries two pin contacts 167, 168 (shown in Fig. 3) mounted in its main portion, which contacts are forced outwardly by spring means to contact disks 26, 46 respectively. Thus, if current is supplied to rods 158, 160, it is carried through contacts 165, 166, respectively, through the body of the slider to pins 167, 168, respectively, and is applied to the surfaces of disk 26, 46, respectively.

A small insulated block 169 is mounted to rotate freely about a shaft 170 set in the slider coaxially with the pin contacts. This block is drilled to receive one end of a rod 171. The other end of the rod is positioned to slide in a second block 172 which is secured to the end of shaft 32. Thus, motion of slider 163 along the rods causes rotation of block 172 and shaft 32. On the side of the block adjacent disk 46 is a small spring contact 173 which is positioned to contact the point inserts 55 on the disk. Contact 173 is insulated from block 172 and electrical contact is brought off by means of wire 174. Wire 174 is formed with a spring insert 175, so that current may be brought out from insert 55 to the contact support 176 on support 152 at all times regardless of relative rotation between block 172 and support 152.

Several other items, used primarily in the electrical system, are also mounted on frame 2, as will be seen in Fig. 3. Partition 7 carries an insulating block 177 with two contact arms 178, 179 (as shown in detal in Fig. 5) which contact slip rings 86, 87, respectively on gear 80. Another insulating block 180 is mounted on partition 7 and supports contacts 181–188, which contact slip rings 61–68 respectively. Side 4 of the frame also carries an insulated block 189 to support contact arm 190 which contacts slip ring 30. Partition 8 mounts a starting relay 191; and a range-change toggle switch 192 and a two button stop-start switch 193 are both mounted on the cabinet 1. A two-wire male plug 194 for use with the loudspeaker is also mounted on cabinet 1, and a limit switch 195 with a button 196 is mounted on support 151.

Figure 10:
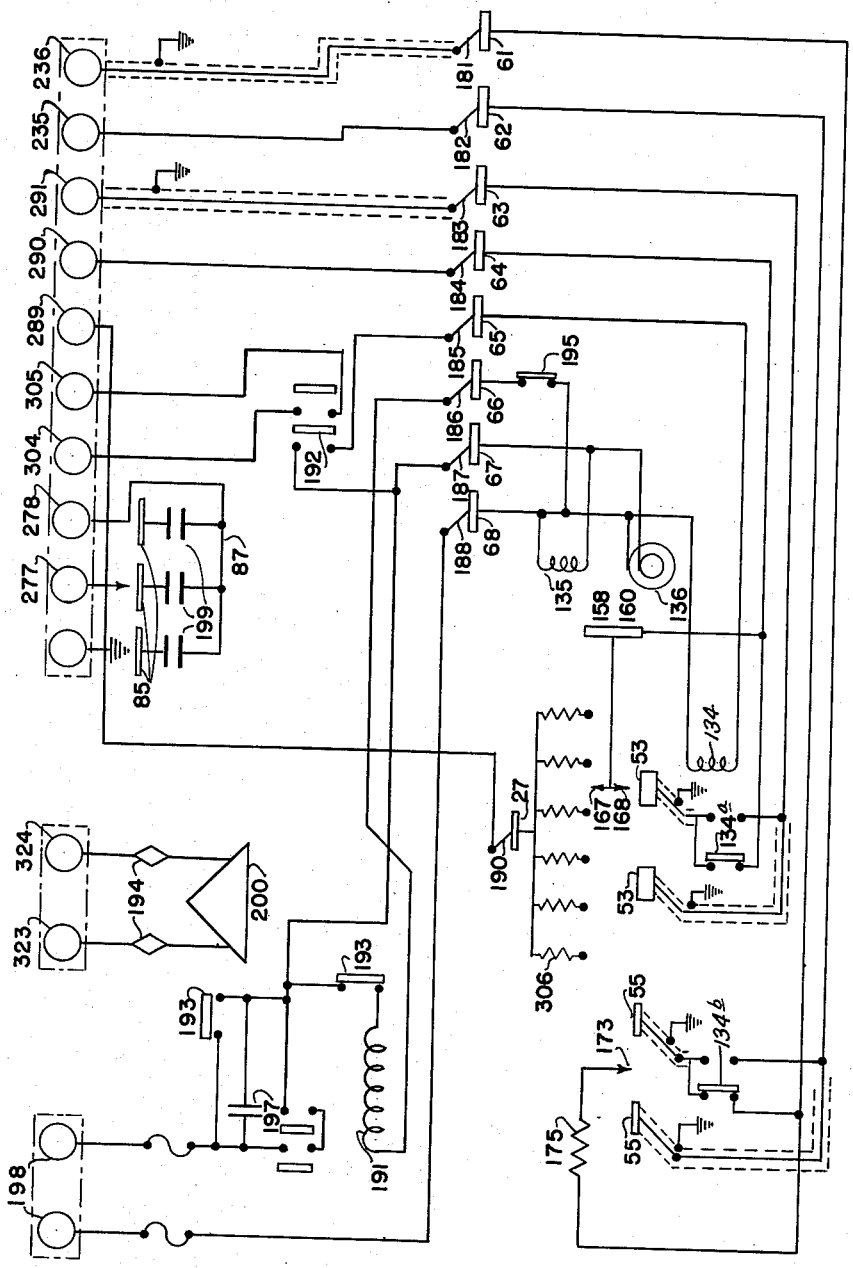
Fig. 10 is an electrical schematic diagram showing the mechanical contacts made in the electrical circuit. The terminals shown are the same as those indicated in Fig. 9.

The electrical circuit which is interrelated with the mechanical system is fed through A.-C. terminals 198 as shown in Fig. 10. Motor 136 and clutch 146 are actuated by throwing the starting switch 193 which actuates the starting relay 191 and clutch relay 135. Condenser 197 is included in the starting circuit to prevent arcing. Current is fed to this system through contact arms 187, 188 and slip rings 67, 68. The starting relay 191 is also actuated (opened) by operation of limit switch 195 when contacted by slider 163, connection to which is provided by means of slip ring 66 and contact arm 186.

The range-change toggle switch 192 actuates the range-change relay 134. The relay is for the purpose of connecting the device so that a signal contact is made between point inserts 55 and contact spring 173 five times during each revolution of disk 46, or only once per revolution by virtue of four of said contacts being removed from the circuit as shown. Additionally, the relay performs the same function with respect to contact made between spiral inserts 53 and pin contact 168 mounted in slider 163. Connections for point inserts 55 and spring contact 173 are provided on the rotating parts by means of slip rings 61, 62 and contact arms 181, 182; similarly, spiral inserts 53 and pin 168 are connected by means of slip rings 63, 64 and contact arms 183, 184.

Pin 167, mounted on slider 163 opposite pin 168, is mounted to contact the angular insert 27 on disk 26, connection to which is made by means of slip ring 30 and contact arm 190.

The connections with spider 77 (the physical structure of which may be seen in Fig. 5) are made by means of contact arm 179 through slip ring 87, mounted on gear 80. Several small condensers 199 are mounted on gear 80 and each is connected to slip ring 87. The other connection to each condenser is made to one or another of the segments of slip ring 85, which in turn is contacted by spider arms 78. Spider arms 79, made integral with arms 78, carry any signal back to slip ring 86, and off through contact arm 178. Spider arms 78 and the segments of slip ring 85 are so spaced that the device operates as a fan switch, well known in the art. The multiple arms 78 are spaced apart a lesser distance than the length of corresponding segments of ring 85, whereby as relative rotation occurs, more and more capacity is introduced into the electrical system because contact with the next in the series of condensers 199 always occurs before contact with the preceding one is broken.

A loudspeaker 200 is mounted on the cabinet, contact being made by means of plug 194 (see Figs. 1, 2 and 3).

Figure 8:
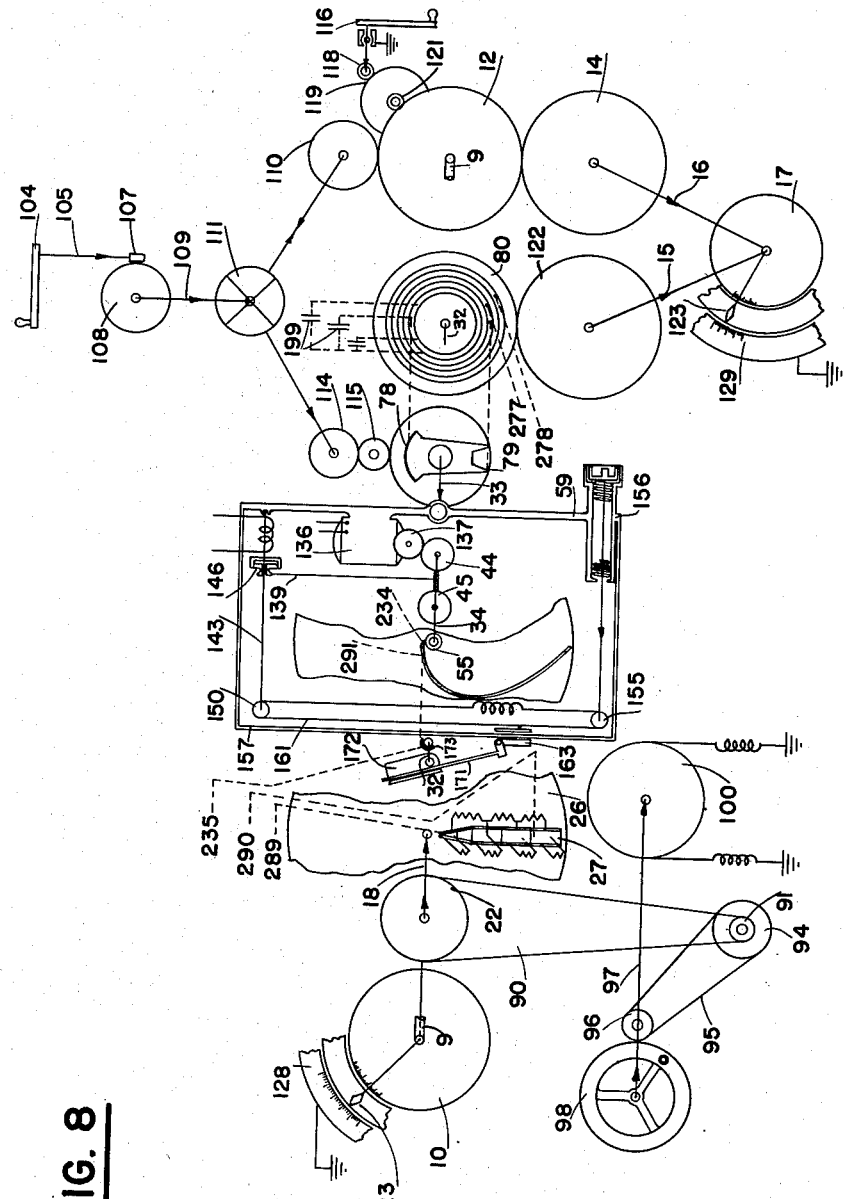
Fig. 8 is a schematic diagram of the mechanical elements of the device, showing the electrical circuit used to control it. In this view arrows indicate torque in shafting, dotted lines indicate electrical connections.

At this point, insert 27 should also be generally described. It is generally sector-shaped, as shown in Fig. 8, to represent the shape of the sound beam which is radiated into the water by echo-ranging gear. It is formed of a plurality of small segments and on the opposite side of disk 26, a plurality of resistances is mounted and connected to the various segments in order that the effective resistance between slip ring 30 and pin 167 varies, depending upon the segment contacted. The center segment nearest the center of the disk is arranged to put no resistance in the circuit, but more and more resistance is put into the circuit as pin 167 progresses radially outward, until it is a maximum at the outer side segment. The side segments, in each case, attenuate the signal slightly more than the adjacent center segment.

Electrical description

As has been described, the purpose of the device, as a whole, is to train and familiarize the student in the operations of sound gear. The mechanical portion of the invention, described above, represents the relative changes in location between target and ship as the problem progresses. An equally important part of the device is the electrical circuit designed to supply to the loudspeaker (or headphones, if desired) sounds simulating those encountered by actual sound gear. The electrical portion of the device is mounted in the cabinet below the mechanical unit.

Figure 9:
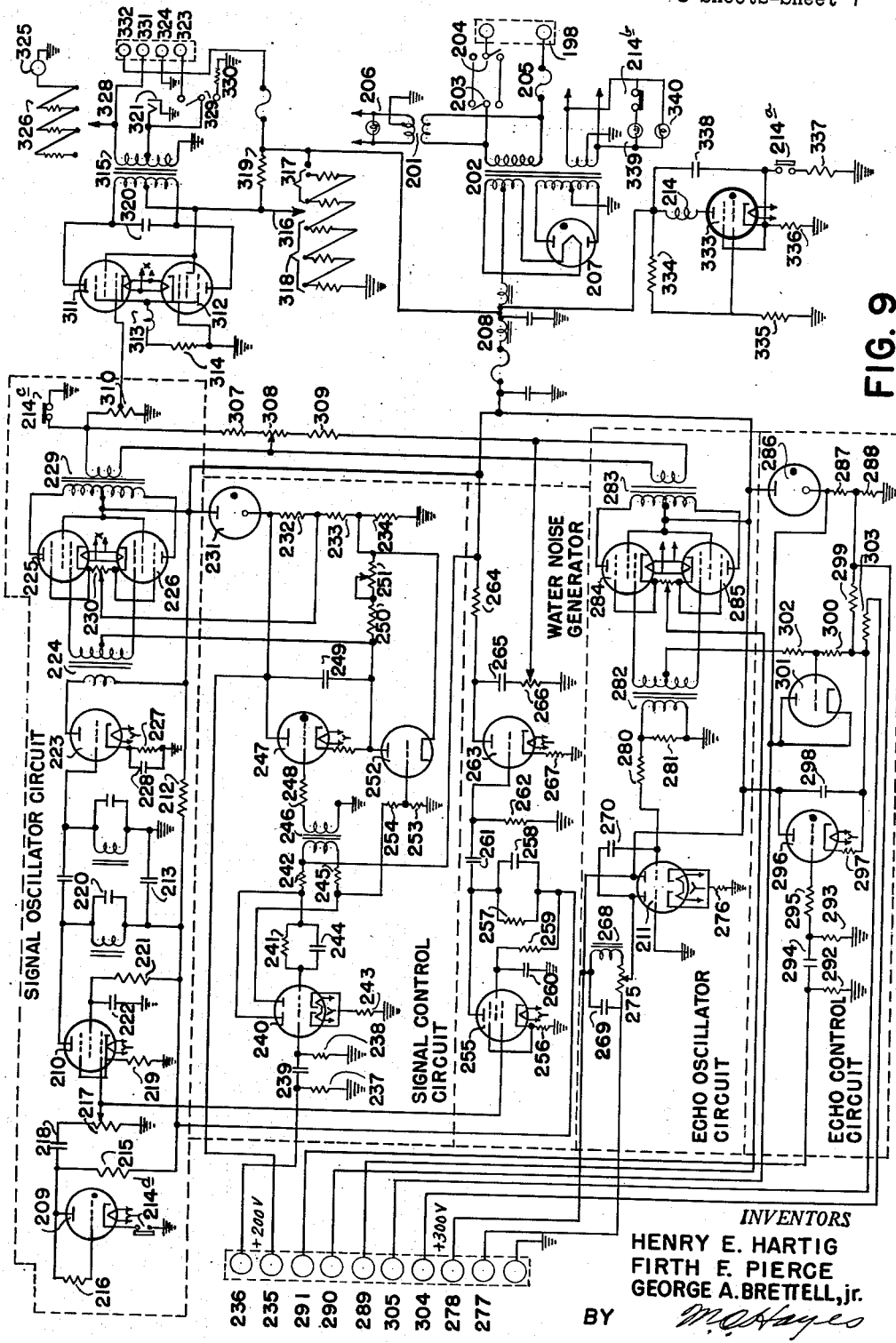
Fig. 9 is an electrical schematic diagram illustrating the noise generators.

A circuit for the production of these sounds is necessary for operation of the invention but the particular circuit described herein is illustrative only and shown in Fig. 9. Other means, such as recordings, might be used if control means for operating the recordings at the proper intervals were provided.

The particular circuit illustrated herein may be generally divided into three sections: (1) signal oscillator and control, (2) echo oscillator and control and (3) water noise. That portion of the circuit dealing with the signal includes the reverberation noise. It should be explained that in actual practice the signal ping is not heard as the receiving portion of the gear is inoperable during the pinging period. Immediately thereafter the receiver is turned on and the resulting reverberation is heard, but this should not be confused with the signal. For our purposes, however, the reverberation noise will be considered as the signal because in actual practice the reverberation noise is audible continuously after the transmitted pulse and should there be an echo it is merely superimposed on the reverberations.

The input power for the circuit is applied to terminals 198 of Fig. 9. This power is applied to transformers 201 and 202 after traversing switches 203, 204, and fuse 205. Transformer 201 supplies some of the tube heaters and pilot lamp 206. Transformer 202 is the main power supply transformer and supplies high voltage A. C. to full wave rectifier 207. Inductances and condensers compose the power supply filter 208. Power is taken off to supply the time delay circuit and the power amplifier, and the voltage appearing at its terminals is supplied directly to all the remaining tubes in the generator with the exception of tubes 209, 210 and 255. These latter three are supplied through an additional filter section resistor 212 and condenser 213.

Consider first the production of the reverberation noise. There is a delay of approximately 40 seconds from the time the main power is turned on before tube 209 fires. It will be noted that the actuating coil for relay 214 is positioned in the plate circuit of tube 333, and it is the delay in firing this tube which gives the desired 40 seconds, the amount of the delay being occasioned by the time it takes condenser 338 to charge up through resistor 336 to a point where the potential on the condenser is sufficient to cause the tube to fire. Tube 209 is a three-element gas tube. Relay contact 214D in the cathode is automatically closed 40 seconds after power is first turned on and the actuating coil of the relay is energized. This action is to prevent damage to the tube's cathode. Plate potential is applied through resistor 215 and a firing condition is insured by resistor 216. Thus, tube 209 fires 40 seconds after the power is turned on and is not extinguished until the power is turned off. It is the nature of tube 209 that a high noise voltage is generated in the plate circuit which has substantially a constant amplitude frequency spectrum. This noise potential is developed across potentiometer 217 through condenser 218. The potentiometer is included in order that adjustment of signal level at this point may be made in compensation for changing characteristics in tube 209.

Tube 210 is biased by resistor 219 and acts as an amplifier to impress a noise current upon the band pass network 220. The screen supply for tube 210 is obtained through dropping resistor 221 and is by-passed to ground through condenser 222. The band pass combination 220 acts in a manner nearly identical with the conventional intermediate frequency transformer in a superheterodyne receiver. The signal emerging from this band pass structure is further amplified by the triode section 223, thence applied through input transformer 224 to the modulators 225 and 226. Bias for this amplifier stage is obtained through resistor 227 and condenser 228. Tubes 225 and 226 are of the remote cut-off type. In these tubes the mutual conductance will vary with the value of D. C. grid bias. Therefore by varying this bias the gain can be adjusted between transformers 224 and 229, the latter being an output transformer. The reason for using two balanced tubes in this connection is to prevent any A. C. component in the grid bias system from entering the signal channel.

Balance potentiometer 230 is adjusted to completely balance tubes 225 and 226 against this effect. Tube 231 is a voltage regulator tube which, in combination with the voltage divider composed of resistors 232, 233 and 234, determines the potentials applied to the modulating stage.

Terminals 235 and 236 provide a point in the circuit where the signal reverberation is initiated by contact between arm 173 and pins 55 (see Fig. 10). Terminal 235 is at a positive potential of 200 volts and terminal 236 is connected to ground through resistor 237 and coupled to resistor 238 through condenser 239. Thus, when contact is made between arm 173 and pin contacts 55, the rectangular pulse resulting from such contact would be converted by condenser 239 and resistor 238 to give successively a positive and negative spike for the grid potential of tube 240.

Generation of a positive and negative spike potential at the grid of tube 240 occurs as follows. When terminals 235 and 236 are connected together, as when arm 173 contacts one of the pins 55 (Fig. 10), the condenser 239 will charge through resistor 238. The variation of this current with time, or rate of charging current flow, multiplied by resistor 238, produces a potential difference between grid and ground. This potential is large at the beginning, at the moment terminals 235 and 236 are closed, and decreases exponentially at a rate depending on the value of the resistance 238 and capacitance 239. When the condenser is charged, the grid is at ground potential again, and when the connection between terminals 235 and 236 is broken, the condenser will discharge through resistors 237 and 238. The rate at which the discharge current changes, multiplied by the resistor 238, provides a potential between grid and ground which now takes the form of a negative spike. When discharge of the condenser is completed, the grid once more assumes ground potential. The elements connected to tube 240 (which can be called a blanking tube) are so apportioned that normally the left-hand section has its grid biased to cut off and the right-hand section has zero grid bias. This occurs because the grid on the right-hand section is receiving current through resistors 241 and 242 to urge it in a positive direction. The cathode resistor 243 develops a voltage drop which is equal to the cut-off value for the left-hand triode. Since the latter normally has its grid at ground potential, no plate current will flow through resistor 242. When a positive spike arrives on the grid of the left-hand triode section, its plate abruptly drops in potential and because of the presence of condenser 244 this drop is transmitted to the control grid of the right-hand section. The grid of the right-hand section of the tube thus becomes biased beyond cut off and even though the pulse across resistor 238 has subsided, the plate current of the right-hand section of the tube remains at zero. This state of affairs continues until the charge on condenser 244 has had time to leak off into resistor 241 and thus bring the right-hand section control grid again into a conducting region. As this action ensues it is self-accelerating by virtue of the rise in cathode potential due to plate current in resistor 245 which acts to cut off further the left-hand section.

Thus, in summary, contact is made across terminals 235 and 236, a rectangular current pulse is generated in the plate circuit of tube 240, whose duration is independent of the time the switch (composed of arm 173 and contacts 55) is closed. Opening of this switch has no effect on the tube since no current will be passed by it as long as its grid has the negative potential resulting from the negative spike produced by the discharge of condenser 239 through resistors 238, 237. This rectangular current pulse is differentiated by transformer 246 so that the resultant signal applied to the grid of tube 247 through the resistor 248 is a negative spike at the beginning of the rectangular pulse and a positive spike at the conclusion. The plate of tube 247 is always held at 200 volts by the voltage regulator tube 231. In the absence of any exciting signal, the condenser 249 which is effectively between plate and cathode of tube 247, is allowed to charge through resistor 250 and control 251 to the junction between resistors 233 and 234, approximately 50 volts above ground. Since the grid of tube 247 is normally at ground potential and the cathode approaches 50 volts, it is seen that the tube is normally cut off. It will not be affected by a negative spike from transformer 246. When a positive spike is impressed, being a gas tube, it will fire and discharge condenser 249 through the tube. The current during this discharge interval is limited by a resistance in order to protect tube 247. Having fired and discharged condenser 249 in a rapidly exponential manner, the tube will extinguish and the charge on condenser 249 will again flow through resistors 250 and 251 to reestablish a static condition. Thus, the potential which effectively controls the grid bias on modulator stage (tubes 225, 226) first rises rapidly and then decreases slowly in an exponential manner and produces a corresponding variation in the strength of the reverberation signal transmitted by the modulating stage. The rate at which this decay occurs is controllable by control 251 which is labeled "Reverberation time."

A triode section 252 is placed across resistor 250 and control 251 in order that any reverberation left from a preceding decay may be "cleaned out" before a new decay starts. Since the grid operates through voltage divider 253 and 254 from the right-hand plate of tube 240, this "clean out" action is seen to take place during the operation of the blanking tube 240.

In considering tube 209 it should be noted that in addition to supplying noise voltage to tube 210, noise voltage is also applied to amplifier tube 255 in the water noise circuit. This tube, biased by resistor 256 and having as a plate load resistor 257 and condenser 258, acts also to integrate and amplify the applied noise pulses so that the resultant amplitude spectrum now varies inversely with the frequency rather than being independent of the frequency. The screen of tube 255 is supplied by resistor 259 by-passed by condenser 260. The output is coupled through condenser 261 and grid leak resistor 262 to the grid of tube 263. This tube acts to amplify further the signal and develops its output across plate resistor 264 which is coupled by condenser 265 to output control 266, which latter is labeled "Water noise." Resistor 267 supplies bias voltage.

In the echo circuit, tube 211 in conjunction with inductance 268, condensers 269, 270 and resistors 275, 276, 280, 281 comprises a sinusoidal oscillator whose frequency is determined by inductance 268, condenser 269 and resistor 275. The action is as follows: Suppose a signal exists between the right-hand grid of tube 211 and ground. The plate of this right-hand section is connected to 300 volts at the output of filter 208. The output voltage of the right-hand section is developed by the cathode across resistor 276 and is directly in phase with the grid voltage. The grid of the left-hand section of tube 211 is held at ground potential and therefore its effective control voltage is the voltage developed across resistor 276. The output voltage appears across the plate load of the left-hand section of the tube and can be seen to be in phase with the grid voltage originally applied to the grid of the right-hand section, but of larger amplitude. When the last mentioned plate and grid are coupled together through condenser 270, it is seen that tube 211 constitutes a negative resistance device and therefore, if it be connected across a resonant circuit oscillations will ensue. Resistor 275 varies the frequency of the resonant circuit. Terminals 277 and 278 provide an additional means of shifting the frequency of this oscillator when small additional condensers 199 are connected across these terminals. The automatic Doppler mechanism in the bearing teacher associated with this signal generator provides condensers 199 for such purpose. Resistors 280 and 281, in addition to providing the bias for tube 211, also constitute a voltage divider which applies a portion of the generator voltage to input transformer 282. The aggregate, transformers 282, 283, tubes 284, 285, voltage regulator tube 286, and voltage divider 287, 288 operates as a modulator for this generated echo in a similar manner to the previously reviewed modulator 225, 226. In this case it is desired to establish a roughly rectangular pulse of the nominal 800 cycles developed by oscillator 211 across output transformer 283.

If contact is made by pin 167 and insert 27 and pin 168 contacts spiral insert 53, a spike is then generated by the combination of resistors 292, 293 and condenser 294, and is applied through resistor 295 to the grid of gas tube 296, which operates with current limiting resistor 297, condenser 298 and discharge resistor 299 in a manner similar to gas tube 247.

It should, however, be noted that the maximum value of the sawtooth bias so generated would result in a large positive potential being applied to the grids of tubes 284, 285. There is therefore interposed between tube 296 and transformer 282 a network consisting of a resistor 300, a diode element 301, the resistor 302, and the distributed capacitance of the winding of transformer 282 to ground. The purpose of resistor 300 and tube 301 is to limit the maximum instantaneous value of the bias to tubes 284, 285; and the purpose of resistor 302 and the distributed capacitance is to round off the corners of the resultant envelope of the echo.

The length of the pulse is controlled by the value of the discharge resistor 299. It is possible to shorten this time by paralleling resistors 299 and 303 by means of the range change switch 192 connected across terminals 304 and 305.

In this explanation a jumper has been assumed between terminals 289 and 290 of Figs. 9 and 10. Actually several resistors connected to function as a variable resistor 306 (shown in Fig. 10) are connected across these two terminals and these resistor acts to govern the amplitude of the transmitted pulse. Physically these resistors are located on metal insert 27 on the disk 46 in the bearing teacher which is operated by the student's training handwheel 98.

The strength of the reverberation signal from transformer 229 is governed by the value of the resistor 307 and the portion of resistor 308 in that loop. The value of the echo signal from transformer 283 is controlled by resistor 309 and the remainder of resistor 308. Since the control 308 acts differentially between transformers 229, 283, it provides a means of changing the ratio of reverberation-to-echo amplitudes and is designated as "Signal-to-echo." The net voltage developed by transformer 229 is added to that developed by transformer 283 and to the output of control 266 and applied through the main gain control 310 to the output stage. Relay contact 214c holds the system quiescent until the 40-second delay is over.

The output tubes 311 and 312 are self-inverting by virtue of the inductance 313 in series with bias resistor 314. A push-pull output signal is therefore developed across output transformer 315. The maximum value of this signal is limited by the value of plate potential applied to this stage. This plate potential is further controlled by the position of switch 316 and resistors 317, 318 and 319. Tap switch 316 is labeled "Output limiter." Output transformer 315 has a gap inserted into the magnetic circuit and the resultant primary inductance tunes with condenser 320 to provide an output channel broadly resonant at 800 cycles. Two secondary windings are provided on transformer 315: one is a low impedance winding which supplies the phone jack 321, and through switch 329, the loudspeaker 200 is connected across terminals 323 and 324; and the other is a 500-ohm winding which supplies the volume indicator 325 and its multiplier which is composed of resistor 326, and tap switch 328. When switch 329 is operated to turn off the loudspeaker, the dummy resistance 330 is inserted across the low impedance winding. Terminals 323, 324 connect the circuit to the loudspeaker 200 through plug 194.

The time delay circuit is composed of relay coil 214, gas tube 333, resistors 334, 335, 336, 337, and condenser 338. Resistors 334 and 335 act in combination as a voltage divider to establish the positive potential with respect to ground of the control grid of tube 33. When plate potential is first applied, condenser 338 is in a discharged condition and therefore the full applied potential is developed across resistor 336 and it is therefore seen that the tube has a large net negative bias. The charge on condenser 338 will slowly grow through resistor 336 and after approximately 40 seconds the cathode will have dropped sufficiently in potential to permit the tube to fire. When the tube fires, the current through actuating coil 214 causes the relay to operate whereby contacts 214A close to effectively shunt resistor 336 with resistor 337. The value of resistor 337 is so chosen as to limit the current through tube 333 and relay coil 214 to its proper value. In addition to the functions already described, relay coil 214 causes normally closed contacts 214B to open thereby extinguishing a red pilot lamp 339, but pilot lamp 340 continues to burn as long as power is supplied. Lamp 339 is labeled "Stand by" and its extinction signifies that the device is ready to operate.

Operation

In operation, the device is designed to be operated by an instructor and a student, seated facing their respective panels. Although the device itself contains an automatic problem, the instructor can, by means of his various controls, vary this problem in many ways.

The problem introduced automatically will be discussed first, and it will then be shown how it may be altered. If, for example, the instructor sets his gyrocompass repeater dial 17 at "North," or zero degrees relative bearing, and sets the bug dial 123 at 30° relative bearing (all shown in Fig. 2), the condition simulated will be that of a ship (when ship is spoken of herein, the ship mounting the sound gear is referred to) proceeding due north with a target discovered 30° off the starboard bow.

If the automatic problem is allowed to proceed, the following condition will be simulated. The ship will maintain its due north course and the target will be found to be moving due west. When the so-called contact point is reached, the target will be located directly off the starboard beam after having approached relatively close to the ship's path. Here the attack would be carried out and the ship, proceeding on, would note that the submarine (if able) would proceed on its due west course, and pass to port off the stern of the ship. The conditions simulated would end when the target's bearing was approximately 185° (relative bearing).

For clarity, it may be best to assume in the above example that the ship remains stationary at all times during the problem. If this is done, the target is, as before, discovered 30° off the starboard bow. If the target proceeds in a straight line course in a direction so that it passes just a beam of the ship on the starboard side and continues on astern of it until it passes across the stern to the port side, the same problem has actually been carried through. As is obvious, this illustrates the relative motion of the target if the ship is considered to be stationary. From the sound operator's point of view, it is the same, although the target in each assumed condition has taken a different course.

The operation of the machine to simulate the events just described can best be understood by referring to Fig. 8. The device is made operable by throwing either switch 203 or 204. Current is thus supplied to the circuit and pilot lights 206, 339, 340 are lighted. When pilot light 339 is extinguished, the device is ready for operation.

When switch 193 is thrown, relays 191 and 135 are actuated, causing engagement of clutch 146 and rotation of motor 136. This drives gear 44 which is mounted on shaft 34 with gear 45. Gear 45 drives clutch 146 and gears 150, 155 by means of gear 138, shaft 139, worm gear 141, and gear 142 on shaft 143. As stated, gears 150 and 155 are connected by chain 161; and so, as gear 150 is driven, the chain carries slider 163 along rods 157, 159. Since echo disk 46 is mounted on shaft 34 with gear 44, the disk rotates and carries the metal inserts 53 with it. Each of these inserts contacts pin 168 (mounted in the slider 163) during each revolution. Likewise, the pin contacts 55, near the center of the disk, contact the arm 173 on block 172 during each revolution. Thus, each time arm 173 contacts a pin 55 an impulse is introduced into the signal control circuit through terminals 235, 236, and a ping results in the loudspeaker 200 connected through terminals 323, 324.

Shortly after the ping impulse is introduced, pin 168 on slider 163 will be contacted by one of the spiral inserts 53 in disk 46. The delay between the ping impulse and this echo impulse initiated by the contact is due to the curvature of the spiral inserts. The echo impulse caused by such contact, when introduced into the echo control circuit through terminals 290, 291, causes an echo signal to be supplied to loudspeaker 200, the strength of which is determined by the amount of attenuation introduced by the particular resistance 306 connected in insert 27. If the device is originally set up with pin 167, in slider 163, in contact with the outer control segment of insert 27 in disk 26, an echo will be clearly heard in the loudspeaker. If, on the other hand, it had been assumed that pin 167 was not in contact with any part of insert 27, the attenuation introduced by contact with the disk itself, would have been infinite and no echo would have been heard.

Continuing on the original assumption, and further assuming that no changes are made in the system by means of the instructor's handwheels, slider 163 will slowly move along rods 157, 159 from one side of the disk to the other. As it does so, rod 171 is caused to slide in block 172 and since block 172 is secured to shaft 32, both block 172 and shaft 32 are slowly rotated. Because gear 80 is secured to the other end of shaft 32, it likewise turns and, through gear 122, bug dial 123 similarly rotates, indicating on the instructor's panel the relative change in direction of the target (as in all cases, the bug dial indicates to the instructor the true and relative bearing of the target).

At this point some further explanation of the echo delay time is pertinent. The delay between the signal ping and the echo is determined by the angular difference between pin contact 55 and the point on spiral insert 53 ultimately contacted by pin 167 in the slider. Fig. 6 shows that the delay is dependent on the distance from the center of disk 26 that the pin 167 contacts the spiral insert. Thus, since the distance of the slider from the center of disk 26 represents the distance of the target from the transducer, the delay time between ping and echo decreases as the slider approaches the center and vice versa.

Since the slider 163 travels along a chord passing near the center of disks 26 and 46, and since insert 27 is positioned along a given radius of disk 26, it is easily seen that during the first part of the simulated run, the pin 167 in slider 163 will remain close to the center of the insert 27. This represents the portion of an actual run in which the target is at a realtively great distance from the sound gear, and little change in bearing takes place. As the slider approaches the mid-portion of its run (which corresponds to that period when the target would be close by) the slider and contact pin 167 will leave contact with the insert 27 and the angle made by the central line of the insert 27 and a line drawn from the center of disk 26 to slider 167 will increase at a much greater rate. This will, of course, be represented on the instructor's panel by a faster turning of bug dial 123, simulating the target's passing close by.

In order that the student be fully trained, he must attempt to so rotate handwheel 98 so that through its gear train (gear 96, chain 95, gear 94, gear 91, chain 90, gear 22) disk 26 is so positioned to have insert 27 in contact with pin 167 at all times. The only information relayed to him for performing this function is that heard in the loudspeaker: if he hears loud echoes, he knows that he is training his projector in the direction of the target; if he hears attenuated echoes, he knows that he is near the actual direction; if he hears no echoes, he knows that he is not training in the proper direction and must search the dial to determine it. Thus, he is given the same training as he would if operating actual gear at sea. To further simulate this operation the friction brake composed of wheel 100 and belts 101 resist the turning of handwheel 98 in an amount comparable to that met in actual gear.

The original problem is completed as the slider 163 passes by the mid-point of rods 157, 159 and continues to the end point, simulating passing the target close abeam and continuing on. As the slider 163 reaches the end point, the limit switch button 196 on limit switch 195 is contacted. The limit switch operates, de-energizing the starting relay 191 and clutch relay 135, just as though the stop button on the starting switch 193 had been pressed. When the clutch 146 is released in this manner, the return mechanism 156 operates in a conventional manner to return slider 163 to its starting point by means of rotating shaft 143 and gear 150. This release places the whole system in its original condition and the whole procedure may be re-instituted only by again operating starting switch 193.

In order that the instructor may be able to estimate the progress of the student, the training procedure requires that during operation the student shall intermittently call out the bearing which he is searching in order that the instructor may guage how well the student is following the changes. This, too, simulates actual practice, for there the sound operator is required to call out to the conning officer, the bearing of the target. If the student properly follows the course of the slider during its entire trip across the disks, he will be calling out the actual bearings of the target, as he would be doing at sea, in order that his ship might follow the target.

In the course of the motion which has been described above in which the target approaches from a distance, passes close abeam, and continues in the same straight line to a remote point, the Doppler effect will be clearly noted. The invention simulates this phenomenon by means of gears 74, 80 and the contact arms and slip rings connected between them. As has been explained, gear 80, mounting slip rings 85, 86, 87, is mounted on shaft 32. Gear 74, mounting spider 77, is secured to shaft 33. As has been explained, arms 78 on the spider form a fan switch for switching in more and more of condensers 199, as relative rotation takes place between spider 77 (shaft 33) and slip ring 85 (shaft 32). Since the echo oscillator circuit (Fig. 10), through terminals 277, 278 is controlled by the capacity introduced by such condensers, they may be and are arranged, in connection with the segments of ring 85, to cause the frequency of the echo signal to gradually decrease as slider 163 moves along rods 157, 159. At the start of its run, the echo signal is of a frequency higher than the projected ping, and at the end of the run, is of a lower frequency than the ping. This phenomenon again simulates actual practice, as when the target is approaching the ship the received echo will be of higher frequency than the projected ping and lower when the target is going away.

In the above description, it is noted that no attempt has been made to alter the problem automatically introduced into the system. The problem assumed is an ideal one which requires no change to be made in the ship's direction for a successful attack, once the target has been located. In practice, the common case is that met where the target is located at some remote spot. By means of the sound gear its direction and speed can be calculated and an attack procedure planned. This will ordinarily consist in changing the direction of the ship to a course such as to bring it across a given point just prior to the target's reaching said point. However, once the change in direction is made, the problem proceeds much in the manner of the ideal case described above.

Since the common case requires an initial change of direction for the ship, the device is provided with a handwheel 116 for simulating this condition. In practice at sea, after the target is originally located, sufficient bearings are taken upon it to enable the ship's officers to estimate its course and speed. This allows a plan of attack to be formulated which consists in bringing the ship across and in front of the target's path. In other words, the ship is turned to such a position as to approximate the beginning of the ideal case described above.

The estimation of the course and speed of the target is ordinarily made as soon as the ship has completed its change in direction and is generally proceeding toward the target.

This whole process is simulated by the instructor who, once the student calls out the initial contact bearing, turns handwheel 116 until gyro-compass repeater dial 17 indicates the approximate bearing indicated by the student. As the student continues to call out the bearings, the instructor calculates the approximate course of the target and again turns handwheel 116 to bring the dial 17 to a position corresponding to the course desired to carry out an attack.

The operation of the handwheel causes operation of both gyro-compass repeater dials 10, 17. This is accomplished through the train composed of gears 118, 119, 121, 12, 14 (Fig. 3). Since the rotation of gear 12 causes shaft 9 to rotate, then dial 10 on the students panel will also rotate. It also causes rotation of the instructor's bug dial 123 to represent a change in relative bearing of the target, and of disk 46, mounted on the carriage 57 secured to shaft 33. Shaft 33, carrying gear 74, also rotates through rotation of handwheel 116 by means of gears 118, 119, 121, 12, 110, 113, 114 and 115. Thus, the change appears to the student on his gyro-compass repeater dial 10 and to the instructor on both the gyro-compass repeater dial 17 and bug dial 123. The instructor still has knowledge of the bearing of the target as represented by his bug dial, but the student is forced to attempt to align his bug dial 23 with the instructor's. Again, the only information available to him in making this determination is that in the loudspeaker; and the device is so arranged that the "dials 10, 17 will be in alignment only when pin 167 in slider 163 contacts insert 27 in disk 26, at the same time that an echo impulse is instituted by the spiral inserts.

The attempts of the student to align the pin and slider correspond to his attempt to keep the transducer trained in the direction of the target which the ship turns. This requires considerably more skill than is required to follow the simple automatic problem and is necessary to properly train him.

Handwheel 104 is ordinarily only used by the instructor in setting up the original simulated position of the target in order that the problem may be different each time the machine is operated. In practice, the sound operator might conceivably pick up the target at any given bearing. Operation of the handwheel 104 causes rotation of the instructor's bug dial through the chain comprising worm gear 107, gear 108, spider 111, gears 114, 115, 74, 80 and 122 (see Figs. 3 and 5). Since gear 74 is secured to shaft 33, its rotation causes rotation of the carriage supports 57, 59 mounting disk 46. In order for the student to receive an echo signal, he must conduct a search by rotating his handwheel 98 (which rotates his bug dial 10 and disk 26) until insert 27 contacts pin 167 in slider 163 at the same time the echo is initiated by spiral 53. This search was necessitated because the position of the slider was changed by rotation of shaft 33.

Although handwheel 104 is ordinarily used as just described, the instructor may also use it after the problem has begun. The condition thus simulated is a rotation or movement of the target about the ship as a center. In this case, the student must also attempt to follow the change in bearing by means of the information available to him from the loudspeaker. If such motion of the target takes place, a revised plan of attack will likewise be instituted.

During the course of the problem, the instructor also is enabled to closely simulate varying noise conditions which the student is likely to meet by operation of the controls on his panel, shown in Fig. 2. By means of control 308 he can change the ratio of the amplitude of signal (reverberation) and echo so that at times the echo will be relatively loud with respect to the signal, and at other times, will be difficult to distinguish from background noises.

By means of control 266, the amplitude of the water noise can be increased to make it difficult to distinguish the signal and echo from the random noise, which is a condition often met in practice.

Control 275 enables the instructor to change the frequency of the echo signal to one considerably above or below the signal frequency. This has an important application where the instructor simulates turning of the target, thus causing changes in the relative motion of the target in the water.

The remaining control 251 allows the instructor to vary the strength and length of the reverberation, which factors are also found to change greatly under changing conditions.

On the student's panel, shown in Fig. 1, are two important controls, the main gain 310 and output limiter 316. The former controls the power introduced into the loudspeaker by the various circuits and corresponds to the gain control on the receiver used in actual practice. The latter, the output limiter, provides an upper limit for the output supplied to the loudspeaker. The volume indicator 325 is also of value to the student in determining the strength of received signals and is controllable by means of the multiplier 326.

It is obvious that the various controls described above give the instructor an opportunity to simulate almost any condition which the student is likely to encounter at sea. A thorough instructor, by properly manipulating the various controls, can so simultaneously operate the electrical and mechanical controls, as to correlate the various motions and sound effects so that the information available to the student is practically identical with that met in operating sound gear.

Having described the invention, we claim:

1. A training device comprising: a substantially sector shaped rotatable conducting member; an indicator mounted for rotation with said member; a contact mounted for movement in a plane adjacent the plane in which said member rotates and along a chord of a circle concentric with the axis of rotation of said member; a second indicator mounted for rotation; means operably connecting said contact to said second indicator for rotating said second indicator in an amount proportional to the angular motion of such contact about the axis of rotation of said member; and means including said contact and said member for providing a signal when said contact touches said member.

2. A training device for sound gear operators comprising an electric circuit; means including a pair of contacts mounted for relative rotation about a common axis for supplying intermittent pulses to said circuit as indicative of an emitted pulse; a second pair of contacts mounted for movement in adjacent planes and including a first contact mounted for rotation about said axis and a second contact operably connected to one of said first pair of contacts and mounted for movement along a chord of a circle concentric with said axis; indicators mounted to indicate the angular positions respectively of each of said second pair of contacts; and means including said second pair of contacts for supplying a second, different pulse as indicative of an echo to said circuit when said second pair of contacts is closed.

3. A training device for sound gear comprising a movable contact mounted for movement along a chord of a circle, representing a target, controllable by an instructor; a second movable contact rotatable about the center of said circle and connectable with said first contact, representing a sound beam, controllable by a student; oscillator means including said contacts for providing an echo signal when connection between said contacts is made; and indicators mounted to indicate the respective positions of said contacts.

4. A training device comprising: a shaft; a substantially sector shaped conducting member mounted for rotation with said shaft; an indicator mounted on said shaft arranged for rotation with said member; a contact mounted for motion in a plane adjacent the plane in which said member rotates and along a chord of a circle concentric with the axis of said shaft; a second indicator arranged for rotation; means operably connecting said contact to said second indicator for rotating said second indicator in an amount proportional to the angular movement of said contact about said shaft; and means including said contact and said member for producing a signal when said contact touches said member.

5. A training device for sound gear operators comprising a shaft adapted to represent the position of a ship; a conducting member mounted for rotation with said shaft and adapted to represent a sound beam; an indicator mounted on said shaft arranged for rotation with said member; a contact mounted for motion in a plane adjacent the plane in which said member rotates and adapted to represent the motion of a target; said contact being mounted for movement along a chord of a circle concentric with said shaft, a second indicator arranged for rotation; means operably connecting said contact to said second indicator for rotating said second indicator in an amount proportional to the angular movement of said contact about said shaft; and oscillator means including said contact and said member for providing an echo signal when said contact touches said member.

6. In the device described in claim 5, said member being substantially sector shaped.

7. A training device comprising: a first contact mounted for rotation in a plane; a second contact mounted for rotation in a second plane, parallel to said plane; a third contact mounted for movement parallel to and intermediate said plane and said second plane and engageable with said first and second contacts; said third contact being mounted for movement along a chord of a circle concentric with the axis of rotation of said first contact; a fourth contact mounted for rotation with said second contact; a contact arm operably connected to said third contact and mounted to touch said fourth contact once during each revolution of said fourth contact; means including said arm and said fourth contact for producing a signal when said arm touches said fourth contact; and means including said first, second and third contacts another signal when said third contact touches said first and second contacts simultaneously.

8. In the device described in claim 7, said means including an electric circuit.

9. An interval timer comprising: two operably connected contacts independently movable in a single plane; one of said contacts being mounted for movement along a chord of a circle concentric with the axis of rotation of said one of the contacts; a member positioned for rotation in an adjacent plane about said axis; a contact spiral mounted on said member and in the plane of said member and engageable with said other of the contacts and a contact mounted for rotation with said spiral contact and engageable with said one of the contacts to touch said two contacts respectively at different times as said member is rotated.

10. In the device described in claim 9, said spiral being an Archimedes spiral.

11. A training device comprising: a rotatable conducting member; an indicator mounted for rotation with said member; a contact mounted in a plane adjacent the plane in which said member rotates for angular and radial movement with respect to the axis of rotation of said member and for engagement with said member, a second indicator connected to said contact for indicating the angular movement of said contact about said axis; and means including said contact and said member for providing a signal when said contact touches said member.

12. In the device described in claim 11, said member being substantially sector shaped.

13. A training device comprising: a rotatable conducting member provided with a predetermined contact area; an indicator mounted for rotation with said member; a point contact in engagement with said member mounted for movement in a plane in which said member rotates and along a chord of a circle concentric with the axis of rotation of said member; a second indicator connected to said contact for rotation in an amount proportional to the angular motion of such contact about the axis of rotation of said member; and means including said contact and said member for providing a signal when said contact touches said member.

14. A training device comprising: a first indicator mounted to indicate the simulated bearing of a target; a second rotatable indicator mounted to indicate the simulated bearing of a sound beam; a first contact operatively connected to said first indicator for movement along a chord of a circle concentric with the axis of rotation of said second indicator for simulating movements of said target; a second contact in engagement with said first contact and mounted with said second indicator and so positioned that said indicators indicate similar bearings when connection between the said contacts is made.

15. In the device described in claim 14, means for providing signal when such connection occurs.

16. A training device for simulating the operation of sound gear comprising a signal source for a transmitted pulse, a signal source for an echo, means including a pair of relatively rotatable and engageable contacts for intermittently initiating said transmitted pulse, manually adjustable rotatable means for simulating the training of a transducer and including a contact rotatable therewith, means including movable and engageable contacts for initiating an echo signal and including one contact rotatable with one of said pair of contacts and another contact operably connected to the other of said pair of contacts and engageable with said manually adjustable contact, and means for indicating the bearing of the transducer when the position of the manually adjustable contact and the movable contacts coincide.

17. A training device for simulating the operation of sound gear comprising means for emitting an echo, means for rendering said echo audible, a rotating echo disk with a plurality of metallic inserts in the face thereof, a manually rotatable transducer disk having an angular metal segment in the face thereof, a plurality of integrally assembled contacts mounted to move simultaneously transversely across the face of the echo and transducer disks, an echo being initiated when one of said contacts touches any of the metallic inserts in the echo disk, the echo being rendered audible through the audible means when another of said contacts touches the angular metal segment in the face of the transducer disk, means for rotating the transducer disk relative to the echo disk until the moving contacts touch the inserts in the two disks simultaneously, and indicating means for showing the degree of angular rotation of the transducer disk when the echo is audible.

18. The device of claim 17 wherein there is an instructor's panel and a student's panel, and means on the instructor's panel to initially alter the relative rotation between the echo and transducer disks whereby the student thereafter simulates operation of the trainer to obtain an echo.

References Cited in the file of this patent

UNITED STATES PATENTS

| | | |
|---|---|---|
| 1,670,448 | Hanna | May 22, 1928 |
| 1,968,647 | Jonas | July 31, 1934 |
| 2,023,488 | Poppen | Dec. 10, 1935 |
| 2,066,156 | Muffly | Dec. 29, 1936 |
| 2,110,869 | Crane | Mar. 15, 1938 |
| 2,146,632 | Lamb | Feb. 7, 1939 |
| 2,321,799 | Cone | June 15, 1943 |
| 2,341,678 | Wickes | Feb. 15, 1944 |
| 2,366,603 | Dehmel | Jan. 2, 1945 |
| 2,405,591 | Mason | Aug. 13, 1946 |
| 2,409,462 | Zworkin | Oct. 15, 1946 |
| 2,416,088 | Deerhake | Feb. 18, 1947 |
| 2,430,125 | Kipnis | Nov. 4, 1947 |
| 2,505,587 | Smith | Apr. 25, 1950 |

FOREIGN PATENTS

| | | |
|---|---|---|
| 521,928 | Great Britain | 1940 |